Patented Jan. 30, 1951

2,539,588

UNITED STATES PATENT OFFICE 2,539,588

ELECTRODEPOSITION OF NICKEL

Paul W. Moy, Cleveland, Ohio, assignor to The Harshaw Chemical Company, Cleveland, Ohio, a corporation of Ohio No Drawing. Application February 17, 1949, Serial No. 77,050

12 Claims. (Cl. 204—49)

This invention relates to the electrodeposition of bright and semi-bright plate from aqueous acid nickel plating solutions.

Some of the most extensively commercialized bright nickel plating solutions have relied upon a plurality of brightening addition agents, no one of which was effective alone. It is the object of the present invention to provide novel nickel plating solutions and novel nickel plating processes wherein there is employed in connection with known basic solutions a novel class of addition agents capable of effecting deposition of the nickel in a form characterized by brightness and increased smoothness. It is an important feature also that such deposits can be produced by the use of a single brightening addition agent. (Even better results can be had in some cases by using also, a second and cooperating addition agent along with addition agents of such class as will be brought out hereinafter.)

The foregoing and other objects of the invention are attained by the use in acid nickel electroplating solutions of certain thianaphthene dioxide compounds, hereinafter set forth. These thianaphthene dioxides may be used according to the present invention in any acid nickel plating solution, but are especially useful in solutions such as the following which are given by way of example only and not by way of limitation of the invention, viz., aqueous acid solutions of nickel sulfate or a mixture of nickel sulfate and nickel chloride or nickel fluoborate or a mixture of nickel fluoborate and nickel sulfate, for example:

Sulfate-chloride bath (Watts type)

| | | |
|---|---|---|
| $NiSO_4.6H_2O$ | grams | 240 |
| $NiCl_2.6H_2O$ | do | 37.5 |
| $H_3BO_3$ | do | 37.5 |
| Anti-pit agent | do | .25 |
| $H_2O$ to make | One liter | |
| pH | | 5.0 |
| CD | ASF | 40 |
| Temp. | ° C | 50 |

Sulfate bath

| | | |
|---|---|---|
| $NiSO_4.6H_2O$ | grams | 300 |
| $H_3BO_3$ | do | 37.5 |
| Formic acid | do | 4 |
| Anti-pit agent | do | .25 |
| $H_2O$ to make | One liter | |
| pH | | 3.0 |
| CD | ASF | 40 |
| Temp. | ° C | 50 |

High chloride bath

| | | |
|---|---|---|
| $NiSO_4.6H_2O$ | grams | 185 |
| $NiCl_2.6H_2O$ | do | 185 |
| $H_3BO_3$ | do | 35 |
| $H_2O$ to make | One liter | |
| pH | | 3.0 |
| CD | ASF | 30 |
| Temp. | ° C | 60 |

Fluoborate bath

| | | |
|---|---|---|
| $Ni(BF_4)_2$ | grams | 350 |
| Water to make | One liter | |
| pH | | 3.5 |
| CD | ASF | 40 |
| Temp. | ° C | 50 |

Fluoborate sulfate bath

| | | |
|---|---|---|
| $NiSO_4.6H_2O$ | grams | 100 |
| $Ni(BF_4)_2$ | do | 250 |
| Anti-pit agent | do | .25 |
| pH | | 4.0 |
| CD | ASF | 40 |
| Temp. | ° C | 50 |
| Water to make | One liter | |

Nickel sulfate and nickel chloride are specified in the foregoing solutions as being added in the form of the hexahydrate. It is to be understood that the anhydrous sulfate or chloride can be used as well as other hydrated forms but the hexahydrates are the most commonly available commercially and it is, accordingly, convenient so to specify these compounds. The anti-pit agent which I have found most suitable for nickel plating in general is sodium lauryl sulfate or a similar higher alcohol sulfate such as one having from 8 to 18 carbon atoms or a mixture of such alcohol sulfates such as that frequently derived from cocoanut oil. Other anti-pit agents such as the alkyl aromatic sulfonate wetting agents are satisfactory. Also, electrodeposition can be carried out in the absence of any anti-pit agent. In most cases it is more satisfactory to use a wetting agent to prevent pitting since most acid nickel electroplating solutions will produce hydrogen pits at times if they do not contain an agent capable of lowering the surface tension of the solution. Nevertheless, it is often possible to produce acceptable deposits without any anti-pit agent and for considerable periods of time. Accordingly, these are not to be regarded as absolute essentials of the solution. Boric acid is included as a buffering agent, but it is to be understood that other buffers may be used such as formic acid, nickel formate, sodium formate or the like as well as citrates or even fluorides, e. g. sodium fluoride. Again, it is possible to obtain good results without any buffering agent although the control of the pH is far more difficult. The pH should be maintained between 2.0 and 6.0 in operation of solutions according to this invention and preferably between 3.0 and 5.0. The cathode current density may vary between wide limits for example, from 5–80 amperes per square foot and the temperature may be from normal room temperature to temperatures approaching the boiling point of the solution, but preferably are from 30 to 70° C.

It is understood that in such electroplating solutions as the examples set forth above, there will also be employed in accordance with the invention an addition agent of the thianaphthene dioxide type in quantity to produce the degree of brightness desired up to full brightness. Trials have shown that quantities from 0.04 to 0.12 gram per liter of brightening addition agent of the thianaphthene dioxide type give good semibright deposits suitable for applications where the deposit is to be buffed. By increasing the amount, additional brightness is produced until full brightness is obtained which occurs at about 0.2 gram per liter. That is, from about 0.2 gram per liter the deposit is usually bright enough to render buffing unnecessary. Increased amounts up to 1.0 gram per liter are desirable from the standpoint of brightness, although brittleness begins to be noticeable at about 0.3 to 0.35 gram per liter. Accordingly, it would appear that for applications where no buffing is to be done, the quantity of thianaphthene dioxide compound might be from 0.2 to 1.0 gram per liter where brittleness is not objectionable and should be from 0.2 to 0.35 gram per liter where brittleness is objectionable. Preferred limits for deposits which are not to be buffed are from 0.22 to 0.35 gram per liter of thianaphthene dioxide or other thianaphthene dioxide compounds hereinafter set forth. In view of the fact that these addition agents are operative at extremely low current densities, they result in good continuous bright deposits in recessed areas. That is, they have the property of imparting good bright throwing power to acid nickel solutions especially those indicated above. Usually increase in nickel chloride content of sulfate-chloride solutions tends to make the deposit harder and this proves to be true in solutions according to this invention.

It has been found that the thianaphthene dioxide addition agents have a further advantage over previously known solutions in being able to tolerate larger quantities of metallic impurities such as copper and zinc. The thianaphthene dioxide compounds, as will be seen from the structural formulae shown below are characterized by the presence of the thianaphthene nucleus ($C_8S$) having two oxygen atoms attached to the nuclear sulfur atom.

The thianaphthene dioxide compounds which have been found suitable according to the invention are thianaphthene dioxide ($C_8H_6SO_2$), mono-, and di-chlorothianaphthene dioxides ($C_8H_5ClSO_2$ and $C_8H_4Cl_2SO_2$) and 3-thianaphthenone-1-dioxide ($C_8H_6OSO_2$). These are represented by compounds of structure as indicated following:

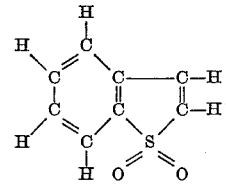

Thianaphthene dioxide

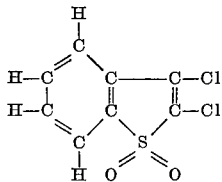

2,3-dichloro thianaphthene dioxide

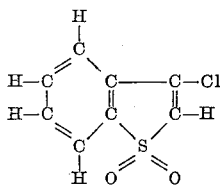

3-chloro thianaphthene dioxide

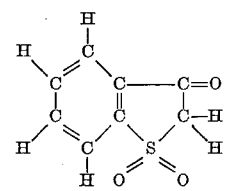

3-thianaphthenone-1-dioxide

A number of specific examples of solutions according to the invention are set forth in the table below and in each case the degree of brightness and other properties of the deposit are indicated as well as the bright throwing power of the solution. While the table illustrates the generality of the utility of these addition agents, we have obtained best results in connection with the mixed sulfate chloride bath which is the most commonly used nickel plating bath in present commercial practice. Such solutions preferably contain from 100 to 350 grams per liter of nickel sulfate hexahydrate and from 10 to 50 grams per liter of nickel chloride hexahydrate. They do not necessarily require any other ingredients except water but preferably contain a buffering agent such as boric acid, formic acid or formates, citrates or the like, boric acid being in general the most satisfactory and normally being present to the extent of from 20 to 50 grams per liter. Ordinarily an anti-pit agent will be used, and for this it is preferred to use a normal primary aliphatic alcohol sulfate containing from 8 to 18 carbon atoms or a mixture thereof. Alkyl naphthalene sulfates and alkyl benzene sulfonates containing from 3 to 10 carbon atoms in the alkyl group may also be used. The anti-pit agent may be used in various proportions, suitably from 0.1 gram per liter up to saturation.

Table

[Concentration in grams per liter, balance substantially all water.]

| | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| NiSO$_4$.6H$_2$O | 240 | 240 | 240 | 240 | 240 | 185 | 185 | 300 | 240 | 240 | 240 | | 100 | 250 | 290 | 250 | 250 | 250 | 250 |
| NiCl$_2$.6H$_2$O | 37.5 | 37.5 | 40 | 40 | 40 | 185 | 185 | | 37.5 | 37.5 | 37.5 | | | 40 | 40 | 37.5 | 37.5 | 37.5 | 37.5 |
| H$_3$BO$_3$ | 37.5 | 37.5 | 30 | 40 | 40 | 35 | 35 | 37.5 | 35 | 37.5 | 37.5 | | | 20 | 40 | 37.5 | 37.5 | 37.5 | 37.5 |
| Formic Acid | | | | 2 | | | | | 2 | | | | | 2 | | | | | |
| Benzene m-disulfonate | | | | | | | | | | | | | | | | | | 5.0 | |
| Acetophenone alpha 2-disulfonate | | | | | | | | | | | | | | | | | 1.0 | | |
| Thianaphthene-1-dioxide 3-sulfonate | | | | | | | | | | | | | | | | | | | 1.0 |
| Ni(BF$_4$)$_2$ | | | | | | | | | | | | 350 | 250 | | | | | | |
| Na Lauryl Sulfate | 0.25 | | 0.25 | 0.25 | 0.25 | 0.25 | | 0.25 | 0.25 | 0.25 | 0.3 | | 0.25 | | .25 | .25 | .25 | .25 | .25 |
| C$_8$H$_4$Cl$_2$SO$_2$ | | | | | | | | | 0.08 | | | | | | | | | | |
| C$_8$H$_5$ClSO$_2$ | | | | | | | | | | 0.08 | | | | | | | | | |
| C$_8$H$_6$OSO$_2$ | | | | | | | | | | | 0.1 | | | 0.1 | | | | | |
| C$_8$H$_6$SO$_2$ | 0.04 | 0.16 | 0.08 | 0.25 | 0.35 | 0.08 | 0.30 | 0.35 | | | | .33 | 0.08 | | .30 | .35 | .35 | .35 | .3 |
| Naphthalene 1,5-disulfonate | | | | | 4.0 | | | | | | | | | | | | | | |
| pH | 3.5 | 3.5 | 4.0 | 3.5 | 3.5 | 4.0 | 4.0 | 3.0 | 3.0 | 3.5 | 4.0 | 3.5 | 4.0 | 4.0 | 3.5 | 3.5 | 3.5 | 3.5 | 3.5 |
| CD, ASF | 40 | 50 | 50 | 50 | 50 | 40 | 40 | 40 | 50 | 40 | 40 | 40 | 40 | 40 | 40 | 5 | 50 | 50 | 50 |
| Temp., °C | 50 | 55 | 50 | 55 | 55 | 50 | 50 | 50 | 60 | 45 | 40 | 50 | 50 | 50 | 60 | 55 | 55 | 50 | 50 |
| Bright | no | no | no | yes | yes | no | yes | yes | no | no | no | no | no | no | yes | yes | yes | yes | yes |
| Semi-bright | yes | yes | yes | | | yes | | | yes | yes | yes | yes | yes | yes | | | | | |
| Ductile | yes | yes | yes | yes | no | yes | | yes | yes | yes | yes | yes | yes | yes | yes | | yes | yes | yes |
| Brittle | no | no | no | no | yes | no | yes | no | no | no | no | no | no | no | no | yes | no | no | no |
| Bright Throwing Power | good | good | fair | good | good | good | good | good | fair | fair | good | good | good | good | good | good | good | good | good |

The foregoing discussion for the most part contemplates the use of only one addition agent or a mixture of a plurality of essentially equivalent addition agents referred to as thianaphthene oxides, being C$_8$H$_6$SO$_2$, C$_8$H$_5$ClSO$_2$, C$_8$H$_4$Cl$_2$SO$_2$ and C$_8$H$_6$OSO$_2$. The present invention, however, conemplates also the use of cooperating addition agents one of which will be one or a mixture of a plurality of the thianaphthene dioxides above named and the other of which will be an aromatic sulfonate such as a benzene sulfonate or an acetophenone or thianaphthene dioxide sulfonate. Following are examples of the monosulfonates of thianaphthene dioxide wherein the sulfonic group is in the 2 or 3 position.

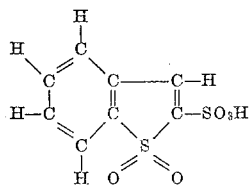

or

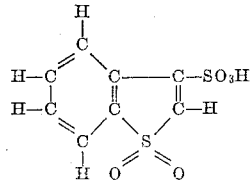

The 2,3-disulfonic acid is an equivalent for my purpose. The sodium potassium, nickel and cobalt salts of the various aromatic sulfonic acids can be used as well as the corresponding sulfonamides and saccharine (preferably its sodium salt). By the use of an auxiliary or ductilizing agent of the type indicated, a larger amount of the thianaphthene dioxide or substituted thianaphthene dioxide brightening and smoothing agent may be used before brittleness in the deposit becomes excessive.

In the range from 0.3 to 1.0 gram per liter of thianaphthene oxide brightening and smoothing agent (including C$_8$H$_5$ClSO$_2$, C$_8$H$_4$Cl$_2$SO$_2$ and C$_8$H$_6$OSO$_2$), the use of from 0.5 to 1.5 grams per liter of sulfonated thianaphthene dioxide avoids brittleness without materially reducing the smoothness of the deposit as sulfonates would ordinarily be expected to do. For example, using the bath of sample 1 of the table but changing the amount of thianaphthene dioxide to 0.3 gram per liter and plating to a thickness of .001" on a steel plate having a smoothness of RMS 29, a deposit was produced having a smoothness of RMS 18. Now adding 1 gram per liter of sulfonated thianaphthene dioxide and plating to a thickness of .001" on a steel plate having a smoothness of RMS 33 a deposit was produced having a smoothness of RMS 16. At 0.5 and 0.75 grams per liter thianaphthene dioxide, other factors remaining constant, comparable results were obtained (43 to 11 against 20 to 5 and 31 to 4 against 27 to 3.5 respectively). Omitting both the thianaphthene oxide and the sulfonate, the improvement in smoothness due to applying one thousandth of an inch of nickel may be expected to be very small, e. g. from 38 before plating to 27 after plating, as one representative test showed. It is thus seen that deposits according to the invention are characterized by greatly improved smoothness as well as brightness. In all these cases the deposits from the solutions containing the sulfonated thianaphthene dioxide were ductile. Sulfonated thianaphthene dioxide inhibits the brittleness so that maximum brightness can be achieved without excessive brittleness and, surprisingly, does so without reduction of "scratch filling" or smoothing properties. (Smoothness values indicated by such symbols as "RMS 20" are obtained by the use of a surface analyzer and the values are approximately the root mean square values of the deviations of the surface from the average surface, expressed in microinches.)

In place of the thianaphthene dioxide sulfonates, acetophenone alpha 2-disulfonate was used in similar quantities and with similar results as to ductilizing effect and even less reduction in smoothing properties. Benzene disulfonates, e. g., benzene metadisulfonate compared favorably with thianaphthene dioxide sulfonate in both respects while benzene monosulfonates and naphthalene sulfonates were not as good as either acetophenone sulfonates or thianaphthene dioxide sulfonates.

Having thus described my invention, what I claim is:

1. A nickel plating composition comprising an aqueous, acid solution of a nickel compound selected from the group consisting of nickel sulfate, mixtures of nickel sulfate and nickel chloride, nickel fluoborate and mixtures of nickel sulfate and nickel fluoborate and from 0.04 to 1.0 gram per liter of a thianaphthene dioxide.

2. In a process for electrodeposition of nickel, the step of effecting electrodeposition from an aqueous, acid solution comprising nickel sulfate and nickel chloride and from 0.04 to 1.0 gram per liter of a thianaphthene dioxide compound of the class consisting of thianaphthene 1-dioxide, mono-chloro thianaphthene 1-dioxides, dichloro thianaphthene 1-dioxide and 3 thianaphthenone 1-dioxide.

3. In a process for electrodeposition of bright nickel, the step of effecting electrodeposition from an aqueous, acid solution comprising nickel sulfate, nickel chloride and cooperating addition agents effective to cause deposition in bright and ductile state, one of said addition agents being a thianaphthene compound of the class consisting of thianaphthene 1-dioxide, mono-chloro thianaphthene 1-dioxides, dichloro thianaphthene 1-dioxide and 3-thianaphthenone 1-dioxide, the same being maintained in said solution in concentration from 0.35 to 1.0 gram per liter and the other of said addition agents being an aromatic sulfonate of the class consisting of benzene disulfonates, acetophenone sulfonates, thianaphthene dioxide sulfonates and saccharine, maintained in solution in concentration from 0.5 to 1.5 grams per liter, said thianaphthene dioxide sulfonates having the sulfonate group attached directly to a carbon atom on the heterocyclic portion of the thianaphthene nucleus.

4. An aqueous, acid nickel plating solution comprising nickel sulfate, nickel chloride and from 0.04 to 1.0 gram per liter of thianaphthene 1-dioxide.

5. An aqueous, acid nickel plating solution essentially consisting of nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, thianaphthene 1-dioxide from 0.04 to 1.0 gram per liter and as an anti-pit agent a normal primary aliphatic alcohol sulfate having from 8 to 18 carbon atoms.

6. An aqueous, acid nickel plating solution essentially consisting of nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, thianaphthene 1-dioxide from 0.3 to 1.0 gram per liter, a thianaphthene dioxide sulfonate from 0.5 to 1.5 grams per liter and as an anti-pit agent a normal, primary, aliphatic alcohol sulfate having from 8 to 18 carbon atoms, said thianaphthene dioxide sulfonate having the sulfonate group attached directly to a carbon atom on the heterocyclic portion of the thianaphthene nucleus.

7. An aqueous, acid nickel plating solution essentially consisting of nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, chlorothianaphthene 1-dioxide from 0.04 to 1.0 gram per liter and as an anti-pit agent a normal primary aliphatic alcohol sulfate having from 8 to 18 carbon atoms.

8. An aqueous, acid nickel plating solution essentially consisting of nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, 3-thianaphthenone 1-dioxide from 0.04 to 1.0 gram per liter and as an anti-pit agent a normal primary aliphatic alcohol sulfate having from 8 to 18 carbon atoms.

9. An aqueous, acid nickel plating solution comprising nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, a chlorothianaphthene 1-dioxide from 0.3 to 1.0 gram per liter, a thianaphthene dioxide sulfonate from 0.5 to 1.5 grams per liter and as an anti-pit agent a normal, primary, aliphatic alcohol sulfate having from 8 to 18 carbon atoms, said thiaphthene dioxide sulfonate having the sulfonate group attached directly to a carbon atom on the heterocyclic portion of the thianaphthene nucleus.

10. An aqueous, acid nickel plating solution comprising nickel sulfate equivalent to from 100 to 350 grams per liter of $NiSO_4.6H_2O$, nickel chloride equivalent to from 10 to 50 grams per liter of $NiCl_2.6H_2O$, boric acid from 20 to 50 grams per liter, 3-thianaphthenone 1-dioxide from 0.3 to 1.0 gram per liter, a thianaphthene dioxide sulfonate from 0.5 to 1.5 grams per liter and as an anti-pit agent a normal, primary, aliphatic alcohol sulfate having from 8 to 18 carbon atoms, said thianaphthene dioxide sulfonate having the sulfonate group attached directly to a carbon atom on the heterocyclic portion of the thianaphthene nucleus.

11. An aqueous, acid nickel plating solution comprising nickel sulfate, nickel chloride and from 0.04 to 1.0 gram per liter of chloro thianaphthene 1-dioxide.

12. An aqueous, acid nickel plating solution comprising nickel sulfate, nickel chloride and from 0.04 to 1.0 gram per liter of 3-thianaphthenone 1-dioxide.

PAUL W. MOY.

REFERENCES CITED

The following references are of record in the file of this patent:

UNITED STATES PATENTS

| Number | Name | Date |
|---|---|---|
| 2,326,999 | Lind | Aug. 17, 1943 |
| 2,469,727 | Hoffman | May 10, 1949 |